United States Patent
Viassolo et al.

(10) Patent No.: US 7,424,169 B2
(45) Date of Patent: Sep. 9, 2008

(54) ACTIVE COMPENSATION OF STREAKS USING SPATIAL FILTERING AND FEEDBACK CONTROL

(75) Inventors: Daniel E. Viassolo, Schenectady, NY (US); Howard A. Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 829 days.

(21) Appl. No.: 10/641,553

(22) Filed: Aug. 15, 2003

(65) Prior Publication Data

US 2005/0036705 A1 Feb. 17, 2005

(51) Int. Cl.
G06K 9/40 (2006.01)
G06K 15/00 (2006.01)
G06T 5/00 (2006.01)
H04N 1/407 (2006.01)
H04N 1/409 (2006.01)
H04N 1/46 (2006.01)
H04N 9/64 (2006.01)

(52) U.S. Cl. .................. 382/274; 358/3.26; 358/504; 348/251

(58) Field of Classification Search ................ 382/274; 358/3.26, 504; 347/19, 251
See application file for complete search history.

(56) References Cited

U.S. PATENT DOCUMENTS

| 5,185,673 | A | * | 2/1993 | Sobol | 358/296 |
| 5,426,517 | A | * | 6/1995 | Schwartz | 358/520 |
| 5,546,165 | A | | 8/1996 | Rushing et al. | 355/208 |
| 6,671,068 | B1 | * | 12/2003 | Chang et al. | 358/1.9 |
| 6,906,828 | B2 | * | 6/2005 | VanDuyn et al. | 358/2.1 |
| 2004/0042676 | A1 | * | 3/2004 | Srinivasa | 382/254 |
| 2004/0071363 | A1 | * | 4/2004 | Kouri et al. | 382/276 |
| 2005/0025462 | A1 | * | 2/2005 | Chang et al. | 386/96 |

OTHER PUBLICATIONS

Pending U.S. Appl. No. 09/738,573, filed Dec. 15, 2002, entitled:"Macro Uniformity Correction for X-Y Separable Non-Uniformity".

* cited by examiner

*Primary Examiner*—Matthew C. Bella
*Assistant Examiner*—Randolph Chu

(57) ABSTRACT

An image processing method to reduce streaking on a printed sheet uses a negative feedback system to reduce streaking. The method scans a printed sheet to produce image data. The method further measures gray-levels of the image data and computes a compensation vector from the measured gray-levels as the difference between a nominal tonal-resproduction-curve and local tonal-reproduction-curves. The compensation vector is applied the image data to be printed. The compensation vector emphasizes ranges of frequencies sensitive of the human eye.

3 Claims, 1 Drawing Sheet

ACTIVE COMPENSATION OF STREAKS USING SPATIAL FILTERING AND FEEDBACK CONTROL

FIELD OF THE INVENTION

The present invention relates to the field of digital imaging and, more particularly, to systems and methods dealing with streaks and other image artifacts that appear on a printed image and which run parallel to the printer's process direction.

BACKGROUND OF THE INVENTION

Macro non-uniformity levels have existed in raster scan image output terminals (IOTs) (e.g., xerographic printers) for some time and are a concern for most marking processes. Even small non-uniformity level errors in raster scan IOTs give rise to visually objectionable banding in halftone outputs (e.g., image macro non-uniformity streak artifacts). Such errors typically arise in raster scan image output terminals (IOTs) due to variations in ROS spot size across the field (which is constant in time (print to print)), donor-roll once-around, HSD wire hysteresis, laser diode variations, LED bar power variation, ROS scan line non-uniformity, photoreceptor belt sensitivity variations, and/or ROS velocity non-uniformity. Significantly, many variations occur only in the fast scan (e.g., X) or slow scan (e.g., Y) directions, and they do not interact to first order. Therefore, a correction made in one direction has a negligible effect on artifacts in the other direction. Other printing technologies (e.g. thermal inkjet and acoustical ink printing) also have artifacts that occur in a regular, predictable manner in one or both directions and fall within the scope of this discussion.

Although techniques have been proposed to eliminate such non-uniformity errors by making physical systems more uniform, it is too expensive to control or limit the error to an acceptable level, below which the error will not be detected by the unaided eye. Fixes have been attempted in the marking process, but not enough latitude exists to fully solve the problem. For problem sources such as LED non-uniformity, the correction is sometimes addressed with current control or pulse width control. However, none of the solutions discussed above implements a technique based in digital electronics. With the cost of computing rapidly decreasing, such digital electronics based solutions are becoming more attractive.

Streaks are image artifacts that appear in a printed image and run parallel to the process direction. They are caused by a non-uniform response of at least one of the xerographic components in a given marking engine. Photoreceptor scratches, HSD-wire contamination, and ROS spot size variations are examples of subsystem problems that can give rise to streaks. The current methods used to mitigate streaks are "passive"; i.e., based on demanding subsystem components of high quality and/or tight manufacturing tolerances. For example, the requirements could be a softer toner with low abrasion, a better coating for the HSD-wire, a more accurate optical system for the ROS, etc. As a result, manufacturing (UMC) and maintenance costs for products increases to cope with stringent image quality requirements. This is undesirable.

What is needed in this art is an image processing method to reduce streaking or other image artifacts which appear on a printed image.

BRIEF SUMMARY

What is disclosed is an image processing method to reduce streaking on a printed sheet. The method uses a negative feedback system to reduce streaking. The feedback system consists of a scanner that scans a printed sheet corrected with an error signal. The error signal is obtained from the scanned image of a previous print off the same printer and the desired output. There are a number of error signals in different positions across the process direction which adjust TRC values. The present invention makes use of a spatial filter representing the spatial frequency sensitivity of the human eye such that only differences (errors) of importance in need of correction are those which can be seen by the human eye. More specifically, a spatially distributed controller is utilized to improve sensitivity to measurement and printer noise. The printer adjusts the incoming bitmap so that each column in the image gives the same response for the same gray level. The printer sacrifices the uniformity of the responses at low and high frequencies where the eye is not responsive so that it can achieve better control at mid-frequencies where the eye is more responsive. At each iteration and for a fixed desired gray-level, the controller processes differences between desired output gray-levels and the values of the gray-levels obtained on the printed output image. A spatial filter is used to emphasize ranges of spatial frequencies critical for a human observer. Then, from these filtered differences (errors), TRC corrections to be applied to the output image are computed using simple scalar integral controllers. Advantageously, since the present invention compensates for defects introduced by lower quality components in a printer, printers can be less tightly specified.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE SPECIFICATION

What is disclosed is an image processing method to reduce streaking on a printed sheet. The method uses a negative feedback system to reduce streaking. The feedback system consists of a scanner that scans a printed sheet corrected with an error signal. The error signal is obtained from the scanned image of a previous print off the same printer and the desired output. There are a number of error signals in different positions across the process direction which adjust TRC values. The present invention makes use of a spatial filter representing the spatial frequency sensitivity of the human eye such that only differences (errors) of importance corrected are those which can be seen by the human eye.

Figure 1:
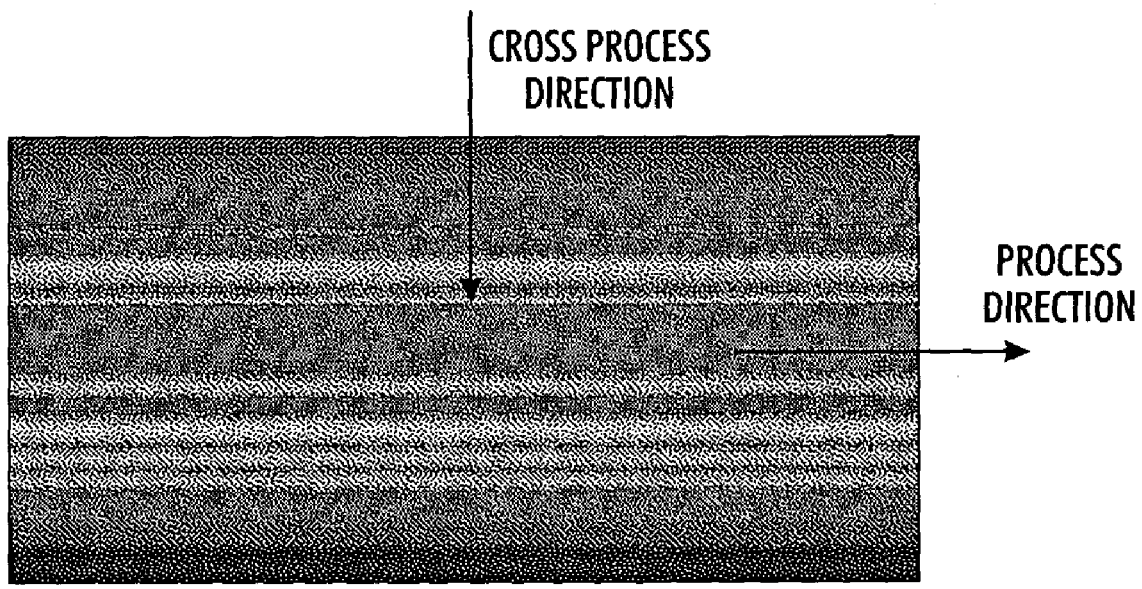
FIG. 1 illustrates the print process direction and the direction of the cross-process.

With reference now being made to FIG. 1, it is important to understand that the process direction is along the line of travel of the print. A cross-process direction is considered to be the direction shown. Also in FIG. 1 are the streaks (lines of varying light and dark pixels on the image running in the process direction) which the present invention compensates for.

Figure 2:
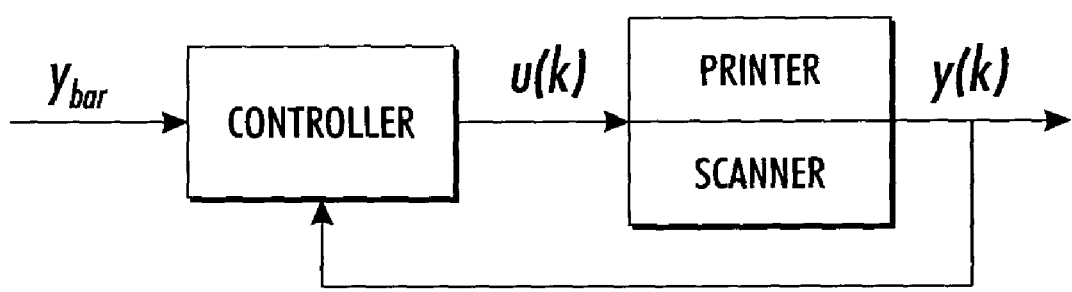
FIG. 2 is a schematic of the closed-loop of the present invention.

With reference now being made to FIG. 2, in general, a feedback loop computes the compensation required for attenuating artifacts on the image. A scanner is used to obtain an electronic version of an output image. The scanner senses printer-output uniformity as a function of cross-process distance and input gray-level (ybar). The gray-level measured by the scanner at iteration k is denoted y(k). The controller is preferably a single-input single-output (SISO) scalar device wherein a cascade of spatial filters move noise to frequencies at which the human visual response is insensitive. The level of compensation computed by the controller at iteration k is denoted u(k). Within the print device, the contone image is modified such that, for a region that prints a light streak the image is darkened. For a region wherein a dark streak appears the image lightened. The image is printed. If need, the image is scanned for yet another iteration. The feedback loop of the present invention is an iterative process wherein convergence to spatial frequencies beyond those which are noticeable by the human can be achieved relatively quickly. In such a manner, streaks and other image artifacts which could be readily seen on the originally input image are visually undetectable on the final output print.

A test pattern of a printed image has a uniform gray-level band introduced across the page in the cross-process direction giving rise to the appearance of non-uniformities or streaking defects, i.e., sections that are darker as well as sections that are lighter than expected. From this image an expected gray-level desired to be achieved on the output image is obtained. A global or nominal TRC (Tone Reproduction Curves) is that which gives the gray-level expected. The image intended for correction is then printed and scanned. The local TRCs give the gray-level for each distance x (each pixel) from the edge of this image in the cross-process direction. For each pixel in the cross-process direction, a difference between local TRCs and the global TRC can be measured. The measured difference between local TRCs and the global TRC result in a compensation value computed therefrom. The amount of correction u(k) is the difference between the desired gray-level (ybar) and the scanned gray-level (y), and is given by: y(k)−ybar. This is passed through a multi-input multi-output (MIMO) spatial filter to limit adjustments to only those spatial frequencies to which the human eye can discern. Without this filter, effort may get wasted on frequencies that are unnoticeable to a human observer. Thus, the spatial filter makes sure that the controller's efforts are primarily directed towards critical frequencies only. The MIMO spatial filter can be represented by a constant matrix M specifically relating error vector e(k) at iteration k with the filtered error vector $e_f(k)$, such that: $e_f(k)=Me(k)$. The filtered output thereof is then preferably sent to individual single-input single-output (SISO) controllers which compute the corrections necessary to drive the filtered errors to zero. A single SISO controller is preferably an integral controller producing output correction: $u_i(k+1)=u_i(k)+ae_{fi}(k)$, where i is the pixel and a is a constant. Each controller gain is preferably tuned so all controllers are the same. This improves speed of response while reducing noise sensitivity.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An image processing system to reduce image artifacts such as streaking on a printed image output comprising:
   a scanner for converting an image on a recording medium into electronic image data;
   a device for measuring gray-levels in said electronic image data;
   a controller for computing a compensation vector for said measured gray-levels based upon the difference between a nominal tonal-reproduction-curve and local tonal-reproduction-curves; and
   a printer for applying said compensation vector to image data to be printed and printing the image data having said compensation vector applied thereto;
   said controller including a cascade of spatial filters to limit compensation values within the compensation vector to human discernible spatial frequencies.

2. An image processing system, as in claim 1, wherein the controller further comprises a plurality of scalar integral controllers for computing tonal-reproduction-curve corrections to be applied to said image data to be printed.

3. An image processing system, as in claim 1, wherein the local tonal-reproduction-curves provide the gray-level for each pixel from the edge of the image in a cross-process direction.

* * * * *